United States Patent
Burgard et al.

(10) Patent No.: US 9,976,923 B2
(45) Date of Patent: May 22, 2018

(54) CAPACITIVE PRESSURE-MEASURING CELL HAVING AT LEAST ONE TEMPERATURE SENSOR AND PRESSURE MEASUREMENT METHOD

(71) Applicant: Endress + Hauser GmbH + Co. KG, Maulburg (DE)

(72) Inventors: Martin Burgard, Schopfheim (DE); Drewes Ulfert, Mullheim (DE); Nils Ponath, Lorrach (DE); Andreas Rossberg, Bad Sackingen (DE); Thomas Uehlin, Schopfheim (DE)

(73) Assignee: Endress + Hauser GmbH + Co. KG, Hauptstr. 1, Maulburg (DE)

( * ) Notice: Subject to any disclaimer, the term of this patent is extended or adjusted under 35 U.S.C. 154(b) by 73 days.

(21) Appl. No.: 15/104,008

(22) PCT Filed: Nov. 14, 2014

(86) PCT No.: PCT/EP2014/074656
§ 371 (c)(1),
(2) Date: Jun. 13, 2016

(87) PCT Pub. No.: WO2015/090771
PCT Pub. Date: Jun. 25, 2015

(65) Prior Publication Data
US 2016/0320256 A1   Nov. 3, 2016

(30) Foreign Application Priority Data

Dec. 20, 2013  (DE) .................. 10 2013 114 734

(51) Int. Cl.
*G01L 19/04*  (2006.01)
*G01L 9/12*  (2006.01)
*G01L 9/00*  (2006.01)

(52) U.S. Cl.
CPC ............ *G01L 9/125* (2013.01); *G01L 9/0072* (2013.01); *G01L 9/12* (2013.01)

(58) Field of Classification Search
None
See application file for complete search history.

(56) References Cited

U.S. PATENT DOCUMENTS 6,532,824 B1 *  3/2003  Ueno ...................... G01B 7/22
                                                73/780
9,383,282 B2   7/2016  Besling
(Continued)

FOREIGN PATENT DOCUMENTS

DE     4011901 A1    10/1991
DE     4111118 A1    10/1992
(Continued)

OTHER PUBLICATIONS

English Translation of the International Preliminary Report on Patentability, WIPO, Geneva, CH, Jun. 30, 2016.
(Continued)

*Primary Examiner* — Andre Allen
(74) *Attorney, Agent, or Firm* — Bacon & Thomas, PLLC

(57) ABSTRACT

A pressure sensor comprises an operating circuit and a pressure-measuring cell comprising a counter body, a measurement membrane, which is arranged on the counter body and can be deformed by a pressure to be measured, and a capacitive transducer, which has at least one membrane electrode arranged on the measurement membrane and at least one counter-body electrode arranged on the counter body. The capacitance between the membrane electrode and the counter-body electrode depends on a pressure-dependent deformation of the measurement membrane, wherein at least the membrane electrode has a temperature-dependent impedance. The operating circuit is designed to sense at least one capacitance between the at least one counter-body
(Continued)

electrode and the at least one membrane electrode and to provide a pressure measurement value on the basis of at least one capacitance and to determine the impedance of the membrane electrode—particularly, the ohmic portion of the impedance of the membrane electrode.

10 Claims, 2 Drawing Sheets

(56) References Cited

U.S. PATENT DOCUMENTS

| | | | |
|---|---|---|---|
| 2011/0308320 A1 | 12/2011 | Recznik | |
| 2013/0118265 A1* | 5/2013 | Besling | G01L 9/0042 |
| | | | 73/724 |
| 2013/0336095 A1* | 12/2013 | Seppa | G01L 9/0016 |
| | | | 367/137 |
| 2014/0053651 A1* | 2/2014 | Besling | G01L 9/0016 |
| | | | 73/702 |

FOREIGN PATENT DOCUMENTS

| | | |
|---|---|---|
| DE | 10044078 A1 | 4/2002 |
| DE | 102005008959 A1 | 9/2006 |
| DE | 102009002662 A1 | 10/2010 |
| EP | 1174696 A2 | 1/2002 |
| EP | 1186875 A2 | 3/2002 |
| EP | 2520917 A1 | 11/2012 |

OTHER PUBLICATIONS

German Search Report, German Patent Office, Munch, DE, Mar. 26, 2014.
International Search Report, EPO, The Netherlands, Feb. 5, 2015.

* cited by examiner

CAPACITIVE PRESSURE-MEASURING CELL HAVING AT LEAST ONE TEMPERATURE SENSOR AND PRESSURE MEASUREMENT METHOD

TECHNICAL FIELD

The present invention relates to a capacitive pressure-measuring cell having a counter body, a measurement membrane that is connected to the counter body and is deformable by a pressure to be measured, and at least one temperature sensor.

BACKGROUND DISCUSSION

Temperature sensors are often integrated in pressure-measuring cells, in order to compensate for the static temperature error. In generic pressure-measuring cells, this temperature sensor is typically arranged on the rear face of the ceramic; it can, however, also be contained inside a connected evaluation electronic device. If a pressure-measuring cell is in thermal equilibrium with its surroundings, the temperature dependence of the pressure measurement can be well compensated for by means of such a temperature sensor and a suitable processing of the measurement signal. However, temperature jumps can lead to significant measuring errors, which can hardly be compensated for using known methods. Especially in the case of ceramic pressure-measuring cells with a thin measurement membrane having a thickness of, for example, only a few 100 μm, with a medium-exposed surface of approx. 1 cm$^2$ to 10 cm$^2$, the temperature of the measurement membrane quickly follows the temperature of the medium the membrane is exposed to, whereas the heat transfer between the rear face of the counter body and the measurement membrane occurs very slowly, namely, via a circumferential joint between counter body and joint on the outer edge of the measurement membrane and then through the volume of the counter body to its rear face. Thus, a temperature measurement at the rear face of the counter body, in case of doubt, is always delayed.

The published German patent application DE 100 44 078 A1 discloses a pressure-measuring cell with two temperature sensors that are to be arranged at a distance in the direction of the expected temperature gradient. For this reason, the first temperature sensor is arranged at the measurement membrane that forms the front face of the pressure-measuring cell, where it can quickly follow the temperature changes of the medium, whereas the second temperature sensor is arranged at the rear face of the counter body of the pressure measuring cell and facing away from the measurement membrane. The first temperature sensor is arranged at the front face of the counter body, embedded in the joint and contacted via electrical transits through the base body.

A comparison between the temperature signals of both temperature sensors then enables the detection of a temperature gradient and a more accurate compensation of the effects that are caused by the temperature gradient, such as a curvature of the measurement membrane and/or the counter body, or changes in rigidities. The patent application mentions further that the temperature gradient can be established using the time derivative of the signal from the first temperature sensor.

However, as mentioned above, the joint between the measurement membrane and the counter body actually provides a significant thermal resistance, so that an additional temperature sensor at the front face of the counter body is, on the one hand, a significant improvement with regard to prior art; on the other hand, this temperature sensor is also exposed to the thermal influence of the counter body volume, so that, in case of quick temperature jumps, distortion is still to be expected. If a sealing ring is impacting the front face of the measurement membrane in the area of the joint, this can also have an influence on the temperature measurement value of the first temperature sensor, which can impair the temperature compensation.

SUMMARY OF THE INVENTION

Thus, the present invention is based upon the objective of providing a pressure-measuring cell and a method for operating it, wherein the pressure measuring cell provides a further improved temperature compensation.

The objective is achieved by the invention through the pressure measurement cell and the method.

The pressure sensor according to the invention comprises an operating circuit; and a pressure-measuring cell comprising a counter body; a measurement membrane, which is arranged on the counter body and can be deformed by a pressure to be measured; and a capacitive transducer, which has at least one membrane electrode arranged at the measurement membrane and at least one counter-body electrode arranged at the counter body, wherein the capacitance between the membrane electrode and the counter-body electrode depends upon a pressure-dependent deformation of the measurement membrane, wherein at least the membrane electrode has a temperature-dependent impedance; wherein the operating circuit is designed to sense at least one capacitance between the at least one counter-body electrode and the at least one membrane electrode and to provide a pressure measurement value on the basis of at least one capacitance and to determine the impedance of the membrane electrode—particularly, the ohmic portion of the impedance of the membrane electrode.

The temperature dependence of the impedance is, in particular, provided by a temperature-dependent ohmic resistance of the membrane electrode material.

In a further development of the invention, the operating circuit is designed to determine a temperature value for the measurement membrane, depending upon the impedance of the membrane electrode.

In a further development of the invention, the operating circuit is designed, depending upon the impedance of the membrane electrode, to perform a temperature compensation and/or temperature gradient compensation, in order to provide a compensated pressure measurement value.

The pressure sensor according to the invention enables the determination of the measurement membrane temperature, which is generally influenced by the entire surface of the measurement membrane, and not only by the edge region, in which the measurement membrane is coupled with other heat sources or heat sinks, which distort the temperature measurement, thus providing an insufficient basis for a temperature compensation.

Furthermore, the pressure sensor according to the invention—unlike the prior art—does not require any additional connections or transits through the counter body for determining the temperature of the measurement membrane. Thus, the determination of the membrane temperature is cost-neutral as far as the design is concerned.

In a further development of the invention, the operating circuit is designed to determine the impedance of the membrane electrode using a time constant of a charge and/or discharge process of the capacitance between the membrane electrode and the at least one counter body electrode.

In a further development of the invention, the operating circuit, along with the capacitance between the membrane electrode and the at least one counter body electrode, forms an oscillating circuit, wherein the operating circuit is designed to determine the impedance of the membrane electrode using a characteristic value of the oscillating circuit, e.g., a phase angle between a charging voltage and a charging current in the oscillating circuit, or using the quality or the damping of the oscillating circuit.

In a further development of the invention, the impedance of the membrane electrode depends not only upon the temperature but also upon a deformation of the measurement membrane, wherein the operating circuit is designed, depending upon the at least one capacitance between the membrane electrode and the at least one counter body electrode, to determine the deformation influence upon the impedance of the membrane electrode, and to compensate for it during the determination of a temperature value of the measurement membrane, wherein the temperature value determined in this way is to be used for performing a temperature compensation and/or temperature gradient compensation during the determination of the pressure measurement value.

In a further development of the invention, the membrane electrode features a semiconductor—in particular, a metal oxide—especially, titanium dioxide.

In a further development of the invention, the pressure sensor further comprises a second temperature sensor, which is arranged on a rear face of the counter body facing away from the measurement membrane, wherein the operating circuit is designed to perform a temperature compensation or a temperature gradient compensation depending upon a temperature of the measurement membrane determined by way of the impedance of the measurement membrane and using a temperature measurement value of the second temperature sensor.

In a further development of the invention, the measurement membrane is joined with the counter body by way of a circumferential electroconductive joint in a pressure-tight manner, wherein the joint comprises, in particular, an active hard solder, and wherein the membrane electrode is connected to the joint in an electroconductive manner.

In a further development of the invention, the capacitive transducer has a differential capacitor with a first counter body electrode and a second counter body electrode, wherein the first counter body electrode is surrounded by the second counter body electrode in a circular manner, and wherein the first capacitance between the first counter body electrode and the membrane electrode equals a second capacitance between the second counter body electrode and the membrane electrode, when the measurement membrane and the counter body are in their rest positions.

The method according to the invention for determining a pressure measurement value by means of a pressure sensor, which pressure sensor has a capacitive transducer for converting a pressure-dependent deformation of a measurement membrane into an electrical signal, wherein the pressure sensor comprises cross-sensitivities regarding the temperature of the measurement membrane and/or regarding the temperature gradient between the measurement membrane and further components of the pressure sensor, wherein the capacitive transducer has a membrane electrode with a temperature-dependent impedance, is a method that comprises the following steps: Determining a deformation-dependent capacitance measurement value of the capacitive transducer; determining a temperature-dependent impedance measurement value of the membrane electrode; and determining a temperature-compensated and/or temperature gradient-compensated pressure measurement value dependent upon the capacitance measurement value and the impedance measurement value.

BRIEF DESCRIPTION OF THE DRAWINGS

The invention is explained in the following in further detail on the basis of the exemplary embodiments shown in the figures. Illustrated are.

DETAILED DISCUSSION IN CONJUNCTION WITH THE DRAWINGS

Figure 1:
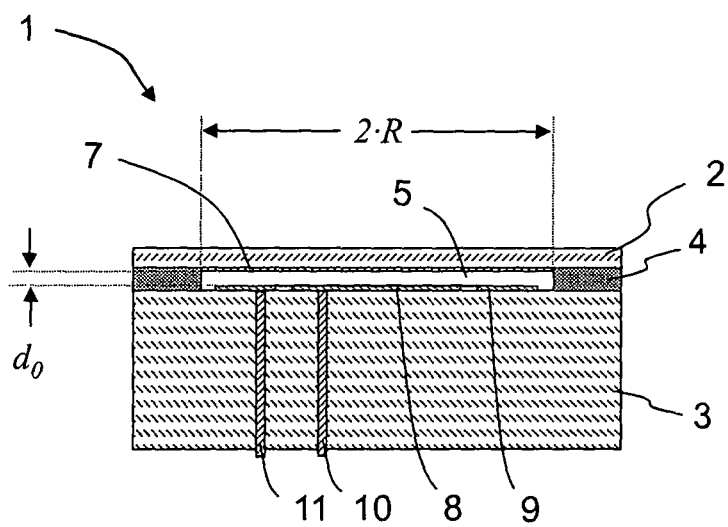
FIG. 1: a longitudinal view through an exemplary embodiment of a pressure-measuring cell according to the invention.

The pressure-measuring cell 1 shown in FIG. 1 comprises a disk-shaped, ceramic measurement membrane 2 that is in a pressure-tight connection along a circumferential joint 4 with a much stiffer disk-shaped ceramic counter body 3, thus creating a measuring chamber 5 between the counter body 3 and the measurement membrane 2. The measurement membrane and the counter body may comprise, in particular, corundum. The joint may comprise, in particular, an active hard solder, for example, a Zr—Ni—Ti active hard solder.

The measuring membrane 2 has a membrane electrode 7 across its entire counter body surface that includes a metal oxide—especially, a doped metal oxide—for example, titanium dioxide doped with Nb or W, wherein the electrode has a diameter of 2 R, with R being the radius of the flexible area of the measuring diaphragm that corresponds to the internal radius of the joint. On the surface of the counter body on the side of the measurement membrane, a central, disk-shaped measuring electrode 8 is arranged that is contacted by a disk-shaped reference electrode 9 which is mainly of the same capacity as the diaphragm electrode 7 in the rest position of the measurement membrane 2. The distance of the reference electrode 9 to the measuring electrode 8 and the joint 4 is about 0.1 R each. The reference electrode 9 and the measuring electrode 8 are in electrical contact via metallic transits 10, 11 through the base body. The membrane electrode 7 may, for example, be placed on switching ground via the joint.

For determining a pressure measurement value, the capacitances between the measurement electrode 8 and the membrane electrode 7, on the one hand, and the reference electrode 9 and the membrane electrode 7, on the other hand, are captured. The determination of a pressure measurement value by means of these capacitances is generally known, and described in, for example, the published German patent application, DE 10 2011 078 557 A1.

The electrode material of the membrane electrode 7 has a temperature-dependent resistance, which provides the opportunity for determining the temperature of the measurement membrane 2, and, based upon that, for performing a temperature compensation or a temperature gradient compensation. For this, different approaches are described below.

Figure 2:
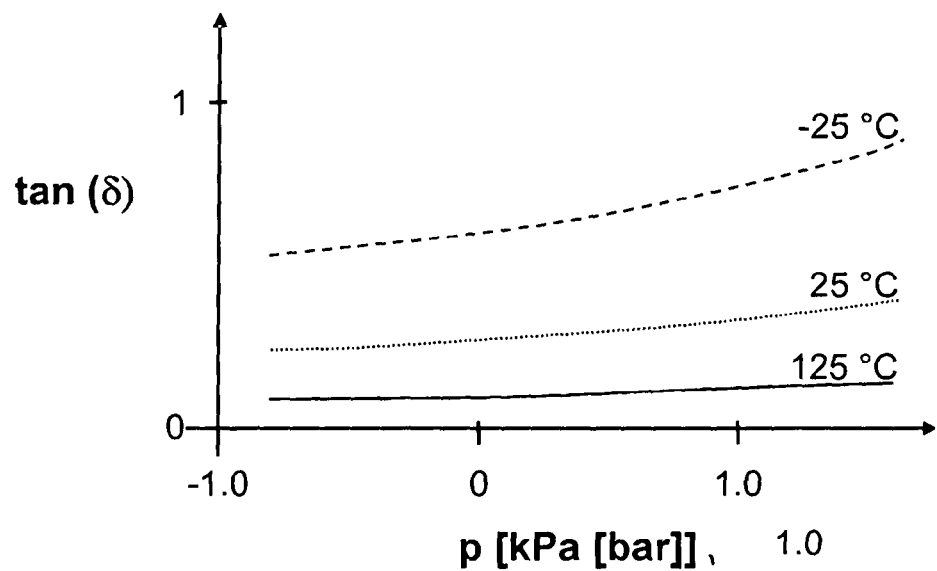
FIG. 2: a diagram that depicts the loss angle tan (delta) as a function at various temperatures of the pressure.

Basically, the capacitances between the counter body electrode and the membrane electrode of the pressure-measuring cell can be viewed as capacitances of an oscillating circuit, wherein the ohmic resistances in such an oscillating circuit can be determined by the tangent of the loss angle tan (δ), wherein the loss angle δ corresponds to the difference between 90° and the phase angle φ between current and voltage. For the pressure-measuring cell of the pressure sensor according to the invention, the determining ohmic resistance is provided by the membrane electrode 7 and ranges over a typical operating temperature range, depending upon doping, between, for example, 1 and 8 kΩ. As shown in FIG. 2, the values for the tangent of the loss angle show a readily measurable temperature dependence, so that, after a determination of the loss angle, whose pressure-dependence still has to be corrected by means of the measured capacitances, the temperature of the measurement membrane 2 can be determined to a sufficiently accurate degree, as to therewith enable a temperature compensation to be performed. For determining the loss angle, an oscillating circuit, which contains the measuring capacitance, needs to be operated preferably at its resonance frequency, which resonance frequency can, for example, be determined by means of a frequency sweep with a given excitation voltage.

In practice, capacitive pressure-measuring cells are often operated by charging pumps or so-called switched capacitor circuits, wherein, for example, a precision capacitor, whose capacitance is to be determined, is charged with a defined voltage, wherein the precision capacitor is subsequently discharged into an evaluation capacitor, wherein the resulting voltage of the evaluation capacitor is a measure for the sought capacitance. Of course, this applies only if enough time is left for the charging and discharging processes. In reality, current operating circuits are designed such that enough time is provided for the capacitances to charge and discharge, which, in the case of small capacitances, often takes no longer than a few microseconds, or even less than 1 μs.

Figure 3:
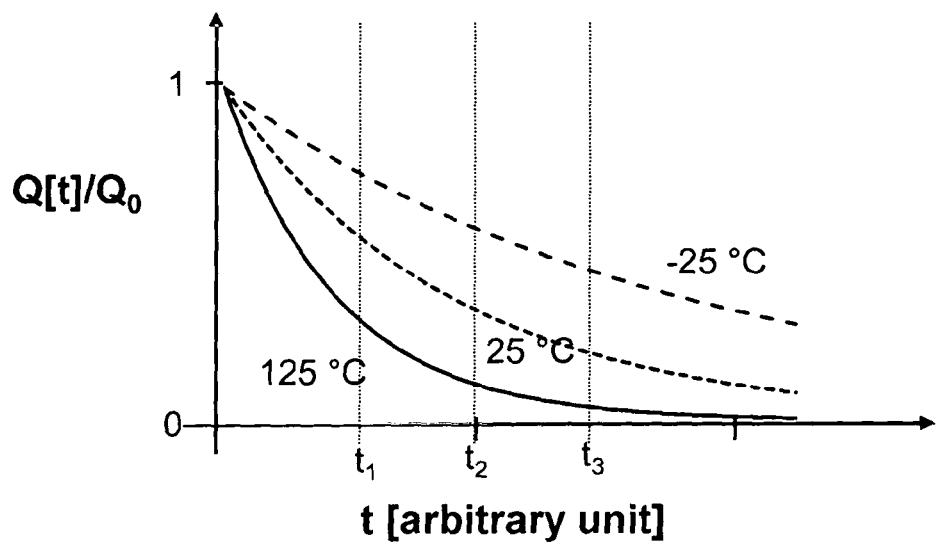
FIG. 3. a diagram that depicts discharge curves of a capacitor at various electrode temperatures.

As shown in FIG. 3, the temperature-dependent resistance of the membrane electrode also has an influence on the discharge time of a capacitor, which contains the membrane electrode. This provides the opportunity, by means of a sequence of charging and discharging processes—during which the capacitances of the membrane electrode are respectively charged and discharged over different times $t_1$, $t_2$, and $t_3$—to determine a time constant and by said time constant to determine a temperature value for the measurement membranes. Based upon this, a temperature compensation or a temperature gradient compensation during the determination of a pressure measurement value can be performed.

For a temperature compensation, on the one hand, only one temperature value for the measurement membrane temperature can be used, which value is determined using the method described above, while, on the other hand, a second temperature sensor (not shown in FIG. 1) can additionally be used, which temperature sensor is arranged on the rear face of the counter body of the pressure-measuring cell. By comparing the temperature values of the measurement membrane and of the rear face of the counter body, an additional temperature gradient compensation is possible. A significant indication for a temperature gradient can also be obtained from the time derivative of the temperature of the measurement membranes.

The operating circuit can, in particular, be realized in the form of an ASIC, which is arranged on the rear face of the pressure-measuring cell. Furthermore, such an ASIC can also be only a partial component of the operating circuit, which ASIC, in particular, communicates with a main processor, which analyses the signals provided by the ASIC for performing a temperature compensation or temperature gradient compensation during determination of a pressure measurement value.

The invention claimed is:

1. A pressure sensor, comprising:
an operating circuit; and
a pressure-measuring cell with a counter body; a measurement membrane, which is arranged on said counter body and is deformable by a pressure to be measured; and a capacitive transducer, which has at least one membrane electrode that is arranged at said measurement membrane and at least one counter body electrode that is arranged at said counter body, wherein the capacitance between said at least one membrane electrode and said counter body electrode depends upon a pressure-dependent deformation of said measurement membrane, wherein said at least one membrane electrode has a temperature-dependent impedance, wherein:
said operating circuit is designed to capture at least one capacitance between said at least one counter body electrode and said at least one membrane electrode, and to provide a pressure measurement value in dependence upon the at least one capacitance, as well as to determine the impedance of said at least one membrane electrode—particularly, the ohmic portion of said at least one impedance of the membrane electrode.

2. The pressure sensor according to claim 1, wherein:
said operating circuit is designed, depending upon the impedance of said at least one membrane electrode, to perform a temperature compensation and/or temperature gradient compensation, in order to provide a compensated pressure measurement value.

3. The pressure sensor according to claim 1, wherein:
said operating circuit is designed to determine the impedance of said at least one membrane electrode using a time constant of a charge and/or discharge process of the capacitance between said at least one membrane electrode and said at least one counter body electrode.

4. The pressure sensor according to claim 1, wherein:
said operating circuit, along with the capacitance between membrane electrode and at least one counter body electrode, forms an oscillating circuit;
said operating circuit is designed to determine the impedance of membrane electrode using a characteristic value of said oscillating circuit, e.g., a phase angle between a charging voltage and a charging current in oscillating circuit, or using the quality or the damping of oscillating circuit.

5. The pressure sensor according to claim 1, wherein:
the impedance of said at least one membrane electrode depends not only upon the temperature but also upon a deformation of said measurement membrane;
said operating circuit is designed, depending upon the at least one capacitance between said at least one membrane electrode and said at least one counter body electrode, to determine the deformation influence on the impedance of said at least one membrane electrode, and to compensate for it during the determination of a temperature value of said measurement membrane; and
the temperature value determined in this way is to be used for performing a temperature compensation and/or temperature gradient compensation during the determination of the pressure measurement value.

6. The pressure sensor according to claim 1, wherein:
said at least one membrane electrode has a semiconductor—in particular, a metal oxide—especially, a titanium dioxide or a doped titanium oxide—for example, titanium oxide doped with Nb or W.

7. The pressure sensor according to claim 1, further comprising:
a second temperature sensor, which is arranged on a rear face of said counter body facing away from said measurement membrane, wherein:
said operating circuit is designed to perform a temperature compensation or a temperature gradient compensation depending upon a temperature of said measurement membrane determined by way of the impedance of said measurement membrane and using a temperature measurement value of said second temperature sensor.

8. The pressure sensor according to claim 1, wherein:
said measurement membrane is joined with said counter body by way of a circumferential electroconductive joint in a pressure-tight manner;
the joint comprises, in particular, an active hard solder; and
said at least one membrane electrode is connected to the joint in an electroconductive manner.

9. The pressure sensor according to claim 1, wherein:
said capacitive transducer has a differential capacitor with a first counter body electrode and a second counter body electrode;
said first counter body electrode is surrounded by said second counter body electrode in a circular manner; and
said first capacitance between said first counter body electrode and said at least one membrane electrode equals a second capacitance between said second counter body electrode and said at least one membrane electrode, when said measurement membrane and said counter body are in their rest positions.

10. A method for determining a pressure measurement value by means of a pressure sensor—particularly, by means of a pressure sensor according to claim 1, which pressure sensor has a capacitive transducer for converting a pressure-dependent deformation of a measurement membrane into an electrical signal, wherein:
the pressure sensor comprises cross-sensitivities regarding the temperature of the measurement membrane and/or regarding the temperature gradient between the measurement membrane and further components of the pressure sensor;
the capacitive transducer has a membrane electrode with a temperature-dependent impedance, wherein the method comprises the following steps:
determining a deformation-dependent capacitance measurement value of the capacitive transducer;
determining a temperature-dependent impedance measurement value of the membrane electrode; and
determining a temperature-compensated and/or temperature gradient-compensated pressure measurement value dependent upon the capacitance measurement value and the impedance measurement value.

* * * * *